(12) United States Patent
Yoshikawa

(10) Patent No.: US 7,241,059 B2
(45) Date of Patent: Jul. 10, 2007

(54) OPTICAL ASSEMBLY WITH A SLEEVE MADE OF AMORPHOUS METAL

(75) Inventor: Satoshi Yoshikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/138,997

(22) Filed: May 27, 2005

(65) Prior Publication Data

US 2005/0271335 A1 Dec. 8, 2005

(30) Foreign Application Priority Data

May 31, 2004 (JP) ............................. 2004-162119

(51) Int. Cl.
G02B 6/36 (2006.01)
G02B 6/30 (2006.01)

(52) U.S. Cl. .............................. 385/92; 385/49; 385/88

(58) Field of Classification Search ............. 385/92–94
See application file for complete search history.

(56) References Cited

U.S. PATENT DOCUMENTS 6,758,602 B2 * 7/2004 Yamaguchi et al. .......... 385/78

| 6,896,417 B2 | 5/2005 | Kobayashi et al. |
| 7,004,646 B2 * | 2/2006 | Ichihara et al. ............... 385/92 |
| 2003/0044124 A1 * | 3/2003 | Saitoh ......................... 385/72 |

FOREIGN PATENT DOCUMENTS

JP 10-332988 12/1998

* cited by examiner

*Primary Examiner*—Brian Healy
*Assistant Examiner*—Charlie Peng
(74) *Attorney, Agent, or Firm*—Venable LLP; Michael A. Sartori; Steven J. Schwarz

(57) ABSTRACT

The present invention is to provide an optical assembly having a sleeve with a good inserting/extracting performance for the ferrule and made of less count of parts. The optical assembly of the invention provides a sleeve, which receives the ferrule with an optical fiber and makes the optical coupling between the optical fiber and an optical device installed in the assembly. The sleeve comprises first and second portions. The first portion provides a slit, while the second portion provides a flange for the sleeve to be positioned. The sleeve of the invention is formed by the molding of amorphous metal containing Cu, Ni, Al, and Zr.

11 Claims, 10 Drawing Sheets

OPTICAL ASSEMBLY WITH A SLEEVE MADE OF AMORPHOUS METAL

BACKGROUND OF THE INVENTION

1. Field of the Invention

The present invention relates to an optical subassembly and an optical data link using the optical subassembly.

2. Related Prior Art

The optical assembly provides an optical semiconductor device, such as light-emitting device or light-receiving device, and a sleeve to couple such optical semiconductor device with an optical fiber secured in an optical ferrule. It is necessary for the sleeve to be elastic along radial directions to enhance the performance of the ferrule inserting into and extracting from the sleeve, and to hold the inserted ferrule securely.

A conventional optical assembly, for example, disclosed in Japanese patent issued as 3,314,667, comprises a sleeve, a bush, and a sleeve case. The split sleeve, which is a cylindrical member extending along a prescribed axis, provides a slit. This split sleeve, holding a stub in one end thereof and receiving the ferrule inserted from the other end, makes the optical coupling between the coupling fiber secured in the center of the stub and the other optical fiber secured in the ferrule. The bush is press-fitted into the end of the sleeve where the stub is held. The sleeve case, also a cylindrical member extending along the prescribed axis, covers the sleeve with the bush being press-fitted between the sleeve and the sleeve case.

This split sleeve has superior characteristics for the ferrule inserting into or extracting from the sleeve, due to its radial elastic function, and for the ferrule holding capability due to the bush press-fitted in the one end thereof.

However, the superior characteristic in inserting/extracting of the ferrule and in holding capability are realized in a combination of the split sleeve, the bush, and the sleeve case. Larger number of parts results in the greater variation in the accuracy of the mechanical dimension.

SUMARRY OF THE INVENTION

Therefore, the present invent is to provide an optical assembly with a sleeve showing a good performance for the ferrule inserting/extracting characteristics and comprising less count of parts. The optical assembly of the present invention comprises a semiconductor optoelectronic device, a package, and a sleeve. The semiconductor optoelectronic device may be a laser diode and a photodiode. The package includes a stem and a cap. When the device is the laser diode, the stem mounts the laser on a side surface of a mount provided on the stem, while the photodiode may be directly mounted on the stem. The cap, cooperating with the stem, forms a cavity the device is installed within this cavity. The cap may provide a lens on a ceiling thereof. The lens may be fired to the cap with a seal glass to seal the cavity in airtight.

In the present invention, the sleeve may be made of amorphous metal that may contain copper (Cu), nickel (Ni), aluminum (Al), and zirconium (Zr). Moreover, the sleeve may be made of molding the amorphous metal. Since amorphous metal shows superior mechanical properties, such as stiffness and brittleness, the sleeve made of such amorphous metal may hold a ferrule in stable and show an excellent performance for the ferrule to insert therein or to extract therefrom.

The sleeve above mentioned may be a split sleeve with at lead one slit extending along an axis of the sleeve. This slit may enhance the elasticity toward radial directions, thereby enhancing the performance for the ferrule not only the insertion or the extraction thereof but also the capability to hold the ferrule inserted therein.

The surface of the sleeve may be oxidized. The oxidized amorphous metal has an excellent stiffness. Even the oxidized thickness is thin, the stiffness of the surface of the sleeve may be enhanced, which improves the tolerance to the electromagnetic interference (EMI) noise and decreases the dust, caused by the ferrule inserting into/extracting from the ferrule.

The sleeve of the present invention may include a first portion and a second portion. The first portion receives the ferrule therein and may constitute the split sleeve, while the second portion may be attached to the cap in the end portion thereof. Moreover, the first portion may comprise a first cylinder and a second cylinder. The first cylinder may receive the ferrule and constitute the split sleeve, while the second cylinder has a diameter greater than a diameter of the first cylinder to cover the first cylinder.

DESCRIPTION OF PREFERRED EMBODIMENTS

Figure 1:
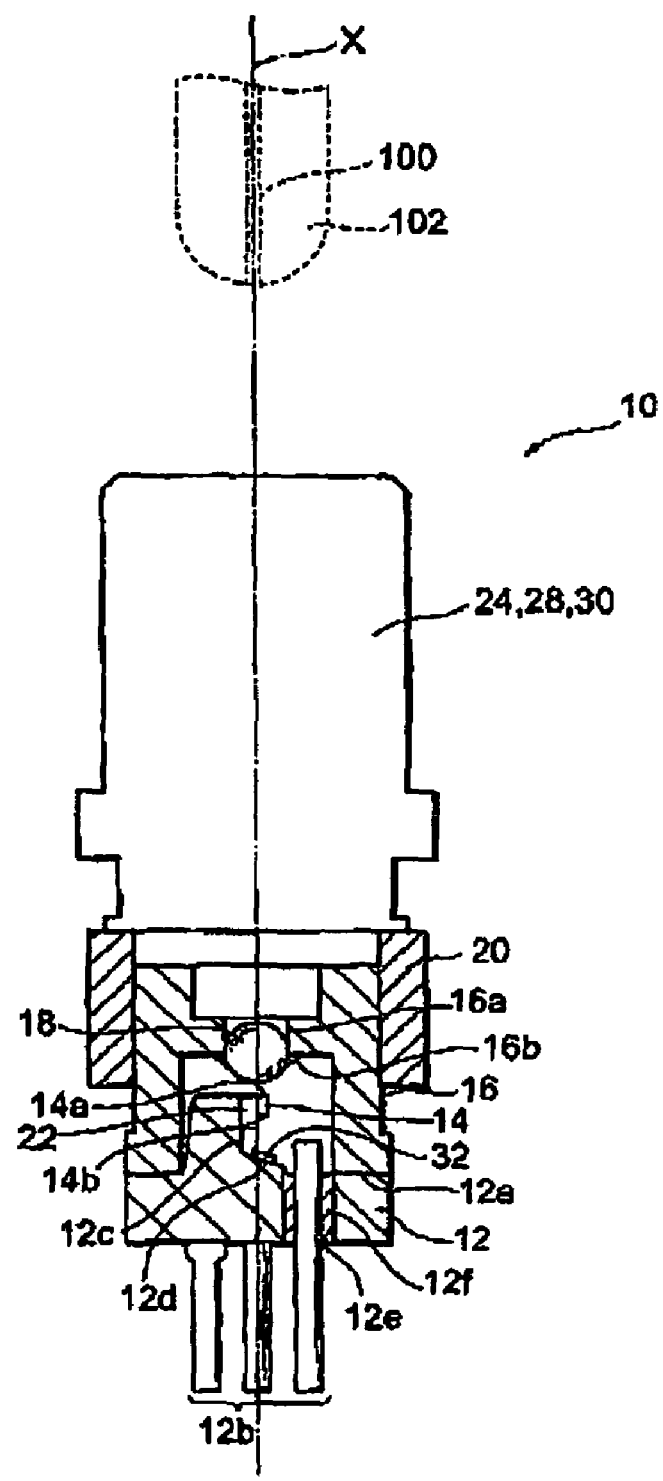
FIG. 1 is a side view of the optical assembly according to the first embodiment of the invention.

Next, preferred embodiments of the present invention will be described as referring to accompanying drawings. In the drawings, same elements will be referred by the same symbols or numerals without overlapping explanations.

First Embodiment

FIG. 1 illustrates an optical assembly according to the first embodiment of the present invention. The optical assembly 10 illustrated in FIG. 1 is one of a transmitting optical subassembly, which is often called as an TOSA, and comprises a stem 12, a light-emitting device 14, a cap 16, a lens 18, an alignment member 20, and a sleeve members, 24, 28, and 30. The stem 14 and the cap 16 constitute a package.

The stem 12 includes a sealing surface 12a, plurality of lead pins 12b, a side surface 12c of a mount, and a slant surface 12d for mounting a light-receiving device 32. The plurality of lead pins 12b pierces each hole 12e provided in the sealing surface 12a of the stem 12 filled with a seal glass 12f within the gap between the lead pin 12b and the hole 12e. The sealing surface 12a intersects an axis X with substantially right angle, and a plurality of holes 12e and a plurality of lead pins 12b each extend along the axis X.

On the side surface 12c of the mount, which extends along the axis X, is provided with the light-emitting device 14 via a thermal block or a beat sink 22. The light-emitting device 14, may be a semiconductor laser diode, is electrically connected to one of the lead pin 12b. In the present embodiment, the light-emitting device 14 includes a front facet 14a, from which output light is emitted, and a rear facet 14b that emits backward light to be monitored by the light-receiving device 32.

On the slant surface 12d is installed with the light-receiving device 32, which may be a semiconductor photodiode. The light-receiving device 32 is electrically connected to the one of lead terminals 12b. The light-receiving device 32 of the present invention receives light emitted from the rear facet 14b of the light-emitting device 14, thereby generating a current corresponding to the magnitude of the monitored light to the lead pin 12b. The slant surface 12d is inclined by an angle to the axis X, thereby reducing the light reflected by the surface of the light-receiving device 32 back to the light-emitting device 14.

The cap 16, which is a cylindrical member extending along the axis X, covers the light-emitting device, cooperated with the stem 1, by forming a cavity into which the light-emitting device 14 is mounted. The cap 16, in one end thereof, is supported and fixed to the sealing surface 12a of the stem 12. The cap 16 is fixed to the stem 12 by, for example the YAG laser welding.

The cap provides a lens-supporting portion 16a with a hole, a diameter of which is smaller than an inner diameter of the cap. The cap 16 secures the lens 18 by inserting the lens 18 into this be 16a. Between the lens 18 and the cap 16 is filled with a seal glass 16b to seal the cavity formed by the cap 16 and the step 12 in airtight.

The alignment member 20, which is also a cylindrical member to cover the outer surface of the cap, adjusts the focal position of the light output from the light-emitting device 14 and passed through the lens 18. The alignment member 20 is fixed to the cap 16 after the optical alignment against the cap 16.

Next, a sleeve according to the present embodiment will be described in detail.

Figure 2:
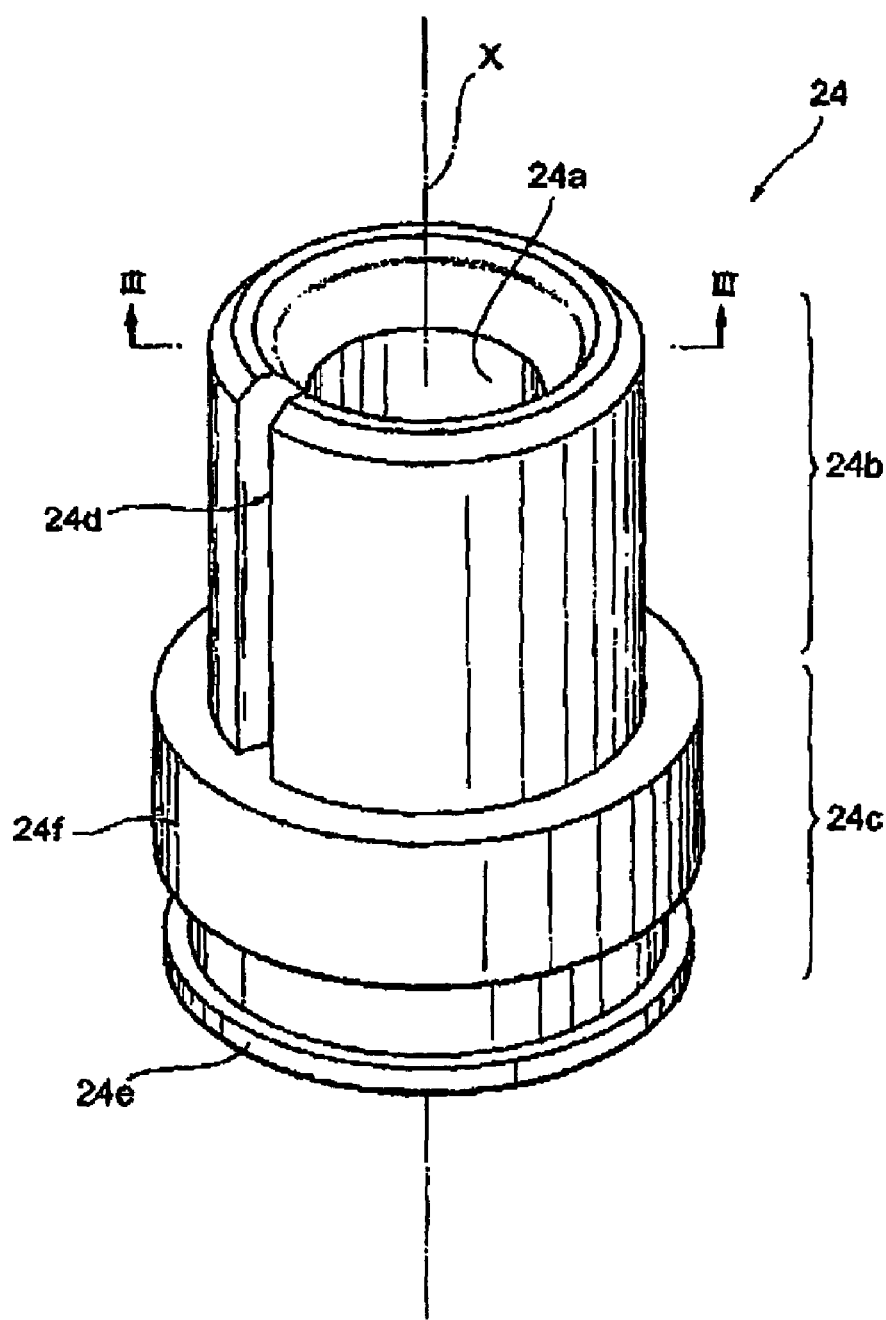
FIG. 2 is a perspective view showing the sleeve applicable to the optical assembly of the present invention.
Figure 3:
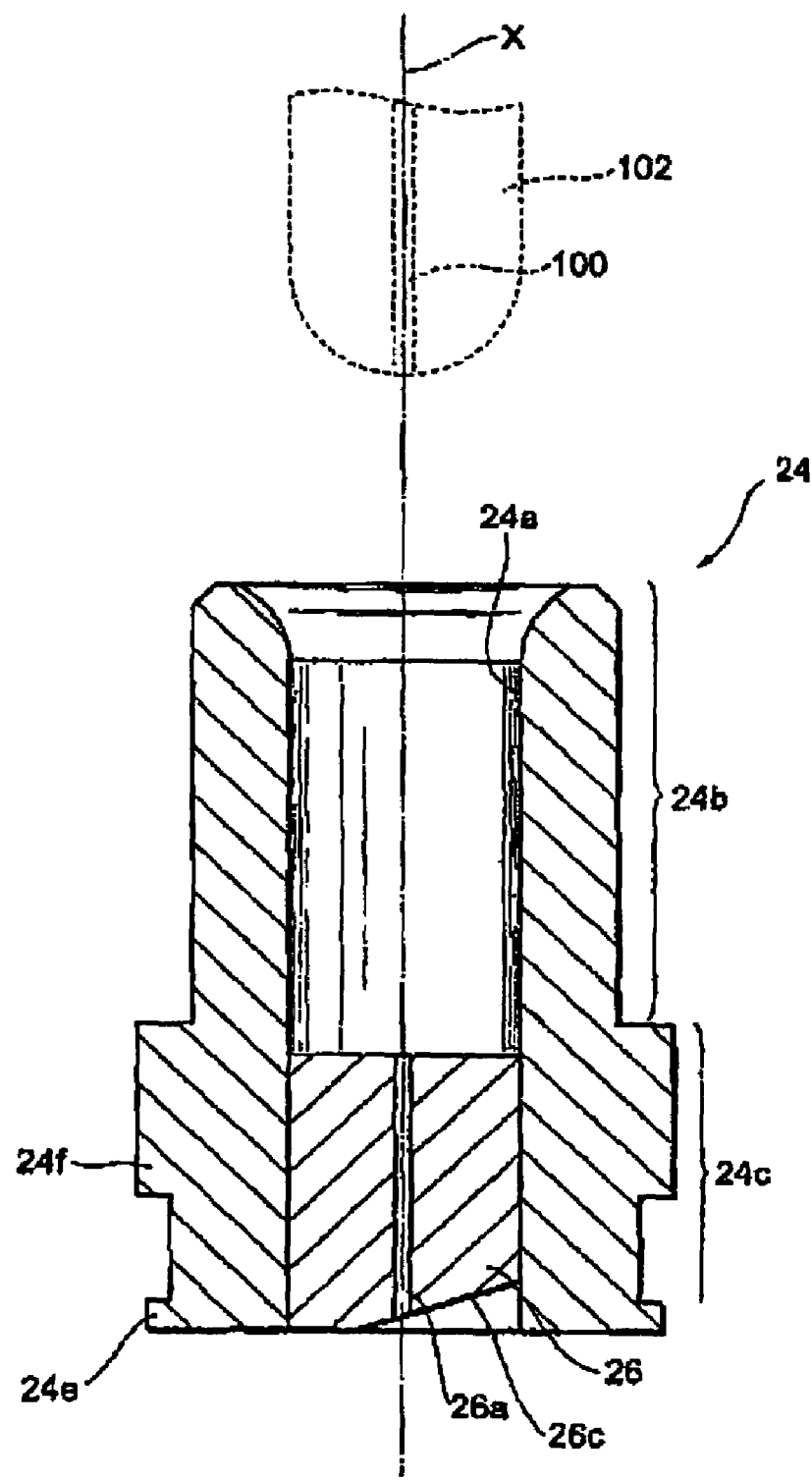
FIG. 3 is a cross section taken along the line III-III illustrated in FIG. 2.

FIG. 2 illustrates a sleeve 24 applicable to the optical assembly, and FIG. 3 is a cross section taken along the line III-III in FIG. 2. The sleeve 24, illustrated in FIGS. 2 and 3, receives a ferrule 102 that secures an optical fiber 100 in a center thereof to couple the light-emitting device 14 in optical to the optical fiber 100. The sleeve 24, is also a cylindrical member, includes an inner surface 24a, a first portion 24b, and a second portion 24c, each extending along the axis X.

The first portion 24b, receiving the ferrule 102 by a hole provided therein, secures the ferrule 102 with the inner surface 24a thereof. The first portion 24b provide a slit 24d that enables the first portion 24a to expand to a direction intersecting the axis X. Accordingly, the sleeve 24 in the first portion 24b thereof has an advantage for the ferrule 102 insertion into/extraction from the sleeve 24.

In the second portion 24c of the sleeve 24 is provided with a stub 26, a coupling fiber 26a is secured in the center of the stub 26. The stub 26 is also a cylindrical member with a hole to secure the coupling fiber 26a. The stub is press fitted into the hole provided in the second portion 24c of the sleeve 24, and is secured by the inner surface 24a. The stub 24 leads the light output from the light-emitting device 14 to the optical fiber 100. One end surface 26c of the stub 26 is, including the tip end of the coupling fiber 26a, inclined to the axis X by a prescribed angle. Accordingly, the light is prohibited, reflected by the end surface 26c, by entering the light-emitting device. One alternative of the inclined surface of the stub 26, an anti-reflecting coating (AR Coating) may be provided in the surface 26c of the end surface 26c.

The second portion 24c is not provided with any slit, which is formed in the first portion 24b. Accordingly, the second portion 24c, tougher than the first portion, rigidly caulks the stub 26 and enhances the stiffness of the first portion 24b. In the bottom end of the second portion 24c is provided with a first flange 24e to weld the sleeve 24 to the alignment member 20 with the YAG laser.

The second portion 24c may provide a second flange 24f from the boundary between first 24b and second 24c portions to toward the end of the second portion 24c. This second flange 24f is used for the positioning of the optical assembly 10 to the optical data link into which the optical subassembly 10 is installed. The detail and functions of the second flange will be explained later.

The sleeve 24, made of amorphous metal is formed by molding. The amorphous metal may typically include copper (Cu), Nickel (Ni), aluminum (Al), and zirconium (Zr). The composition is, as an example, 25.5 wt % of copper, 8.9 wt % of nickel 3.6 wt % of aluminum, and the rest of zirconium. Since the sleeve 24 is formed by molding, not only the optical assembly 10 includes less count of members but also the sleeve can have a dimensional accuracy.

Moreover, the sleeve 24 may be oxidized after the molding. The oxidization forms a thin insulating film made of, for example zirconium, on the surface thereof. Therefore, comparing to the conventional metal sleeve, the tolerance to the electromagnetic interference (EMI) noise may be enhanced and the dust, caused by the ferrule inserting into/extracting from the ferrule, may be decreased, because the insulating sleeve does not show no antenna effect and the oxidized thin film has the superior stiffness.

Figure 4:
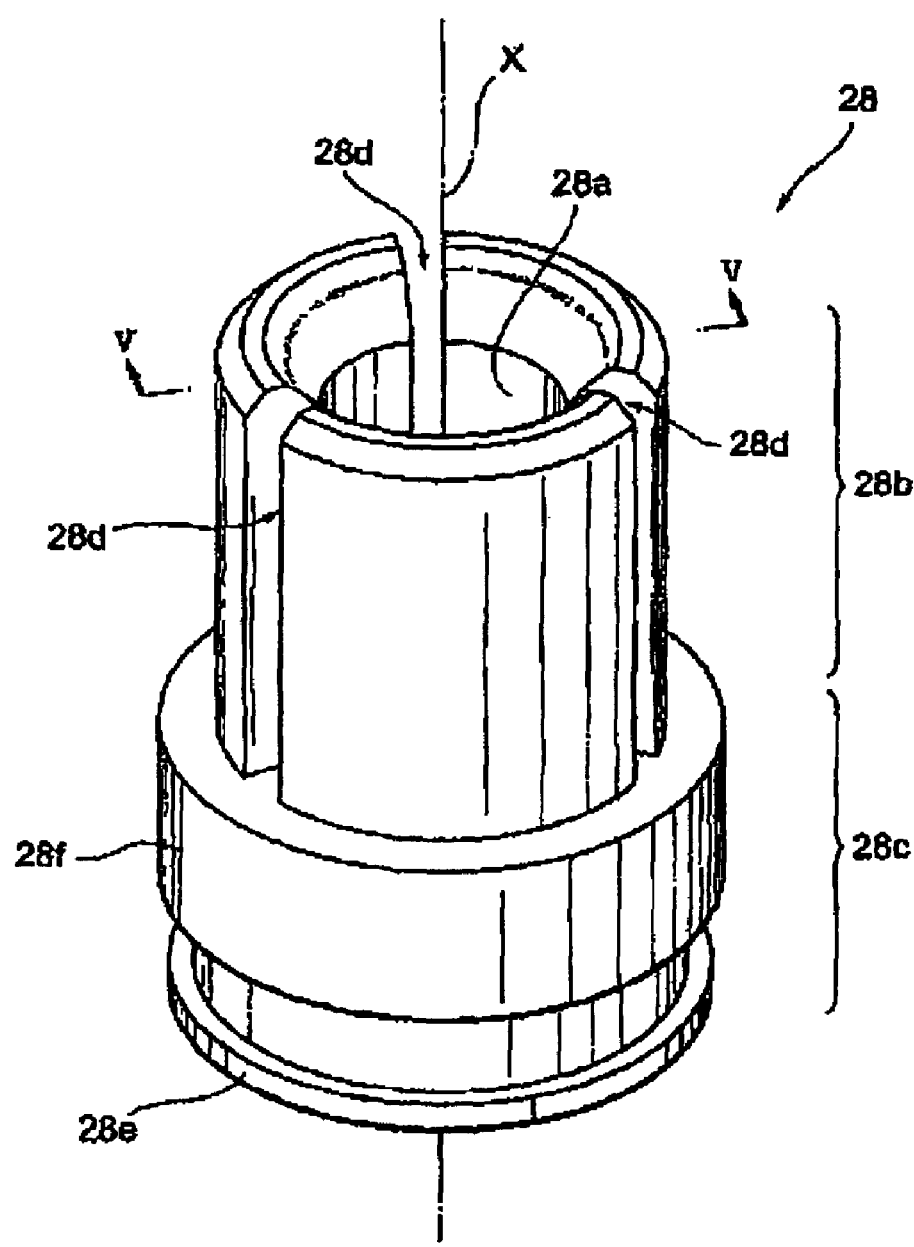
FIG. 4 illustrates another sleeve applicable to the present optical assembly of the invention.
Figure 5:
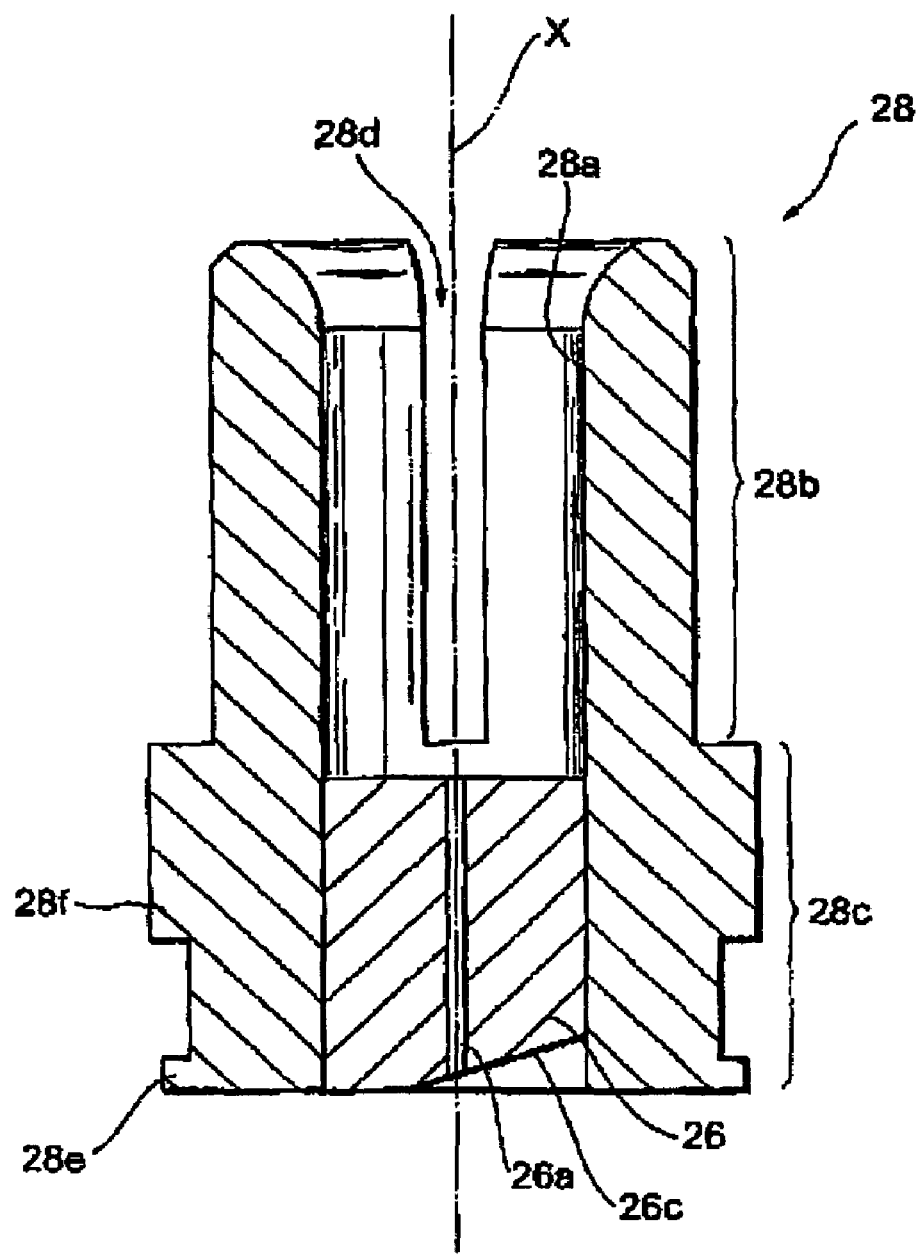
FIG. 5 is a cross section taken along the line V-V illustrated in FIG. 4.

Next, alternatives to the sleeve 24 will be described FIG. 4 illustrates another sleeve 28 applicable to the present optical assembly 10, and FIG. 5 is a cross section taken along the line V-V in FIG. 4.

The sleeve 28, similar to the sleeve 24 shown in FIGS. 2 and 3, includes an inner surface 28a, first and second portions 28b and 28c, and first and second flanges 28e and 28f, respectively. Further, the sleeve 28 is also made of amorphous metal and is oxidized for the surface thereof after the molding.

The sleeve 28 forms multiple slits 28d, three slits in the embodiment shown in FIG. 4, which is also similar to the slits 24d in the previous embodiment. By forming slits, the first portion may show the moderate elastic force to radial directions. The count of slits may be variable depending on the requited stiffness and the elasticity of the first portion.

Figure 6:
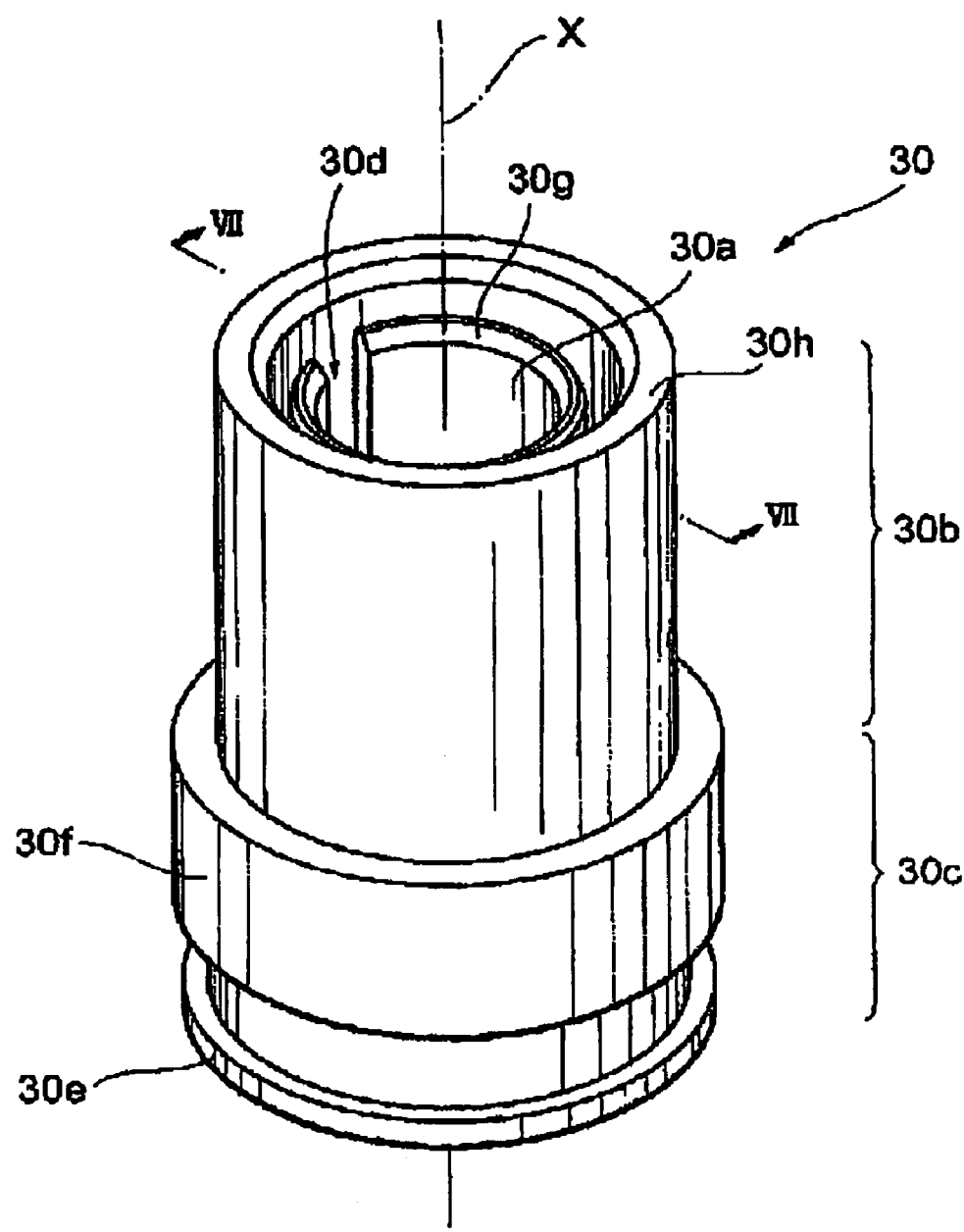
FIG. 6 is a perspective view of still another sleeve applicable to the optical assembly of the invention.
Figure 7:
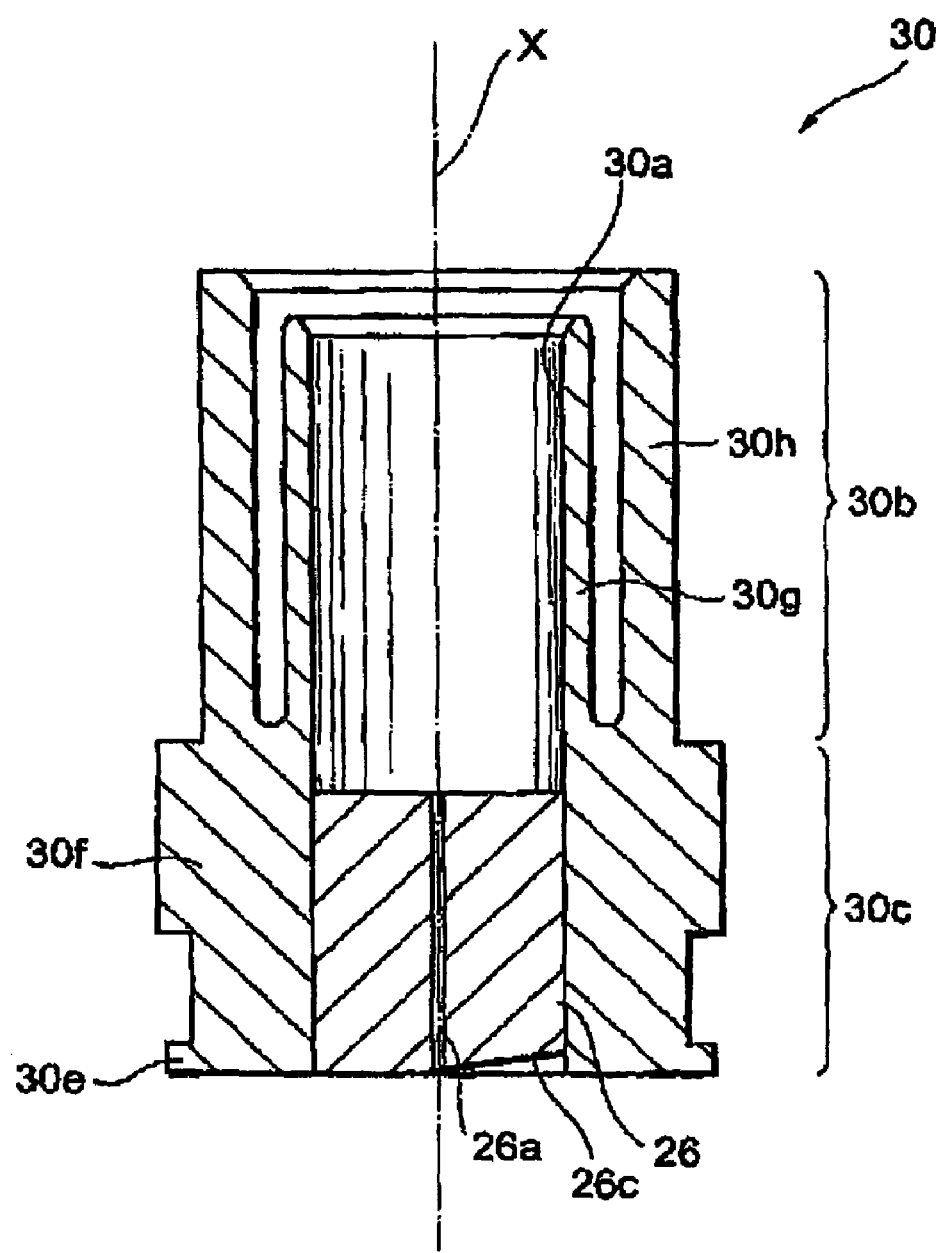
FIG. 7 is a cross section taken along the line VII-VII illustrated in FIG. 6.

FIG. 6 shows still another modified sleeve 30 applicable to the present optical assembly, and FIG. 7 is a cross section taken along the line VII-VII in FIG. 6.

The sleeve 30 provides a second portion 30c and first and second flanges 30e and 30f, respectively, which are similar to those corresponding portions shown in the sleeve 24. Further, the sleeve 30 is also formed by the molding of the amorphous metal and is oxidized in the surface thereof.

The first portion 30c of the sleeve 30 comprises two cylinders, 30g and 30h, both extending along the axis X. The second cylinder 30h positions in the outside of the first cylinder 30g. The first cylinder 30g provides an inner surface 30a, same as the inner surface 24a of the sleeve 24, that secures the ferrule when the ferrule is inserted into the sleeve 30, and a slit 30d that has a function also same as the slit 24d of the sleeve 24. According to the sleeve 30, the first cylinder 30g may be designed in its dimensions and the elasticity to fit the standard of the optical connector, while the second cylinder 30d may be designed only on the viewpoint from the cylinder 30d covering the first cylinder 30g.

Second Embodiment

Figure 8:
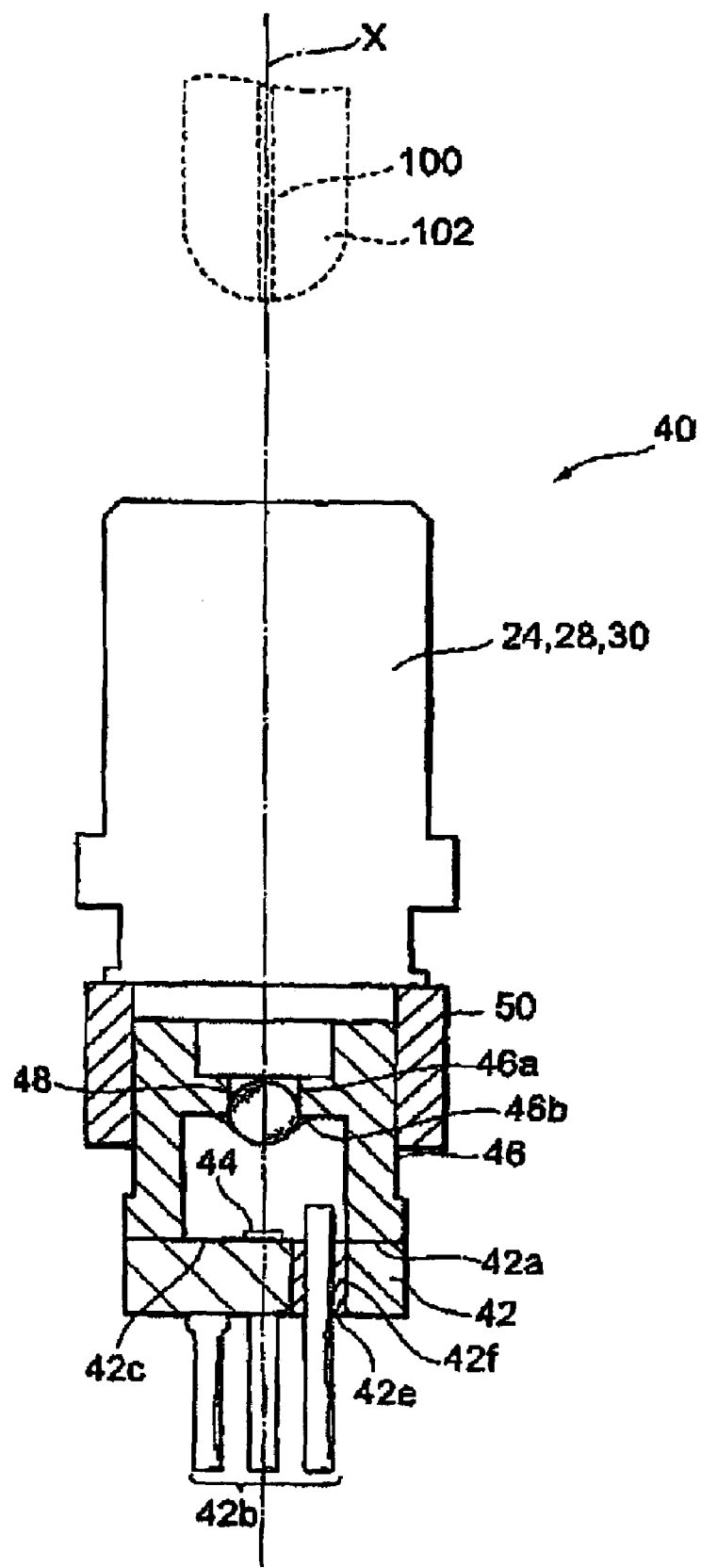
FIG. 8 illustrates another optical assembly according to the second embodiment of the invention.

FIG. 8 illustrates another optical assembly according to the second embodiment of the invention. The optical assembly 40 shown in FIG. 8 is a receiving optical subassembly, which is occasionally called as a ROSA, including a stem 42, a light-receiving device 44, a cap 46, a lens, an optical alignment member 50 and a sleeve 24, 28, and 30.

The stem 42 includes a sealing surface 42a, a plurality of lead pins 42b, and a mounting surface 42c that mounts a light-receiving device 44 such as photodiode. Two surfaces, 42a and 42c, extend along directions intersecting the axis X. The stem 42 also provides a plurality of holes 42e, through which the lead pins 42b pass. Between the lead pins 42b and the holes 42e is filled with a seal glass 42f to seal in airtight the cavity the light-receiving device is installed therein. The light-receiving device 44 is electrically connected to one of lead pins 42b.

The sealing surface 42a mounts a cap 46 thereon. The cap has a same configuration to that 16 shown in the first embodiment, and includes a lens 46a. The optical assembly 40 may provide, same as the optical assembly 10, the same sleeves, 24, 28, and 30.

Third Embodiment

Figure 9:
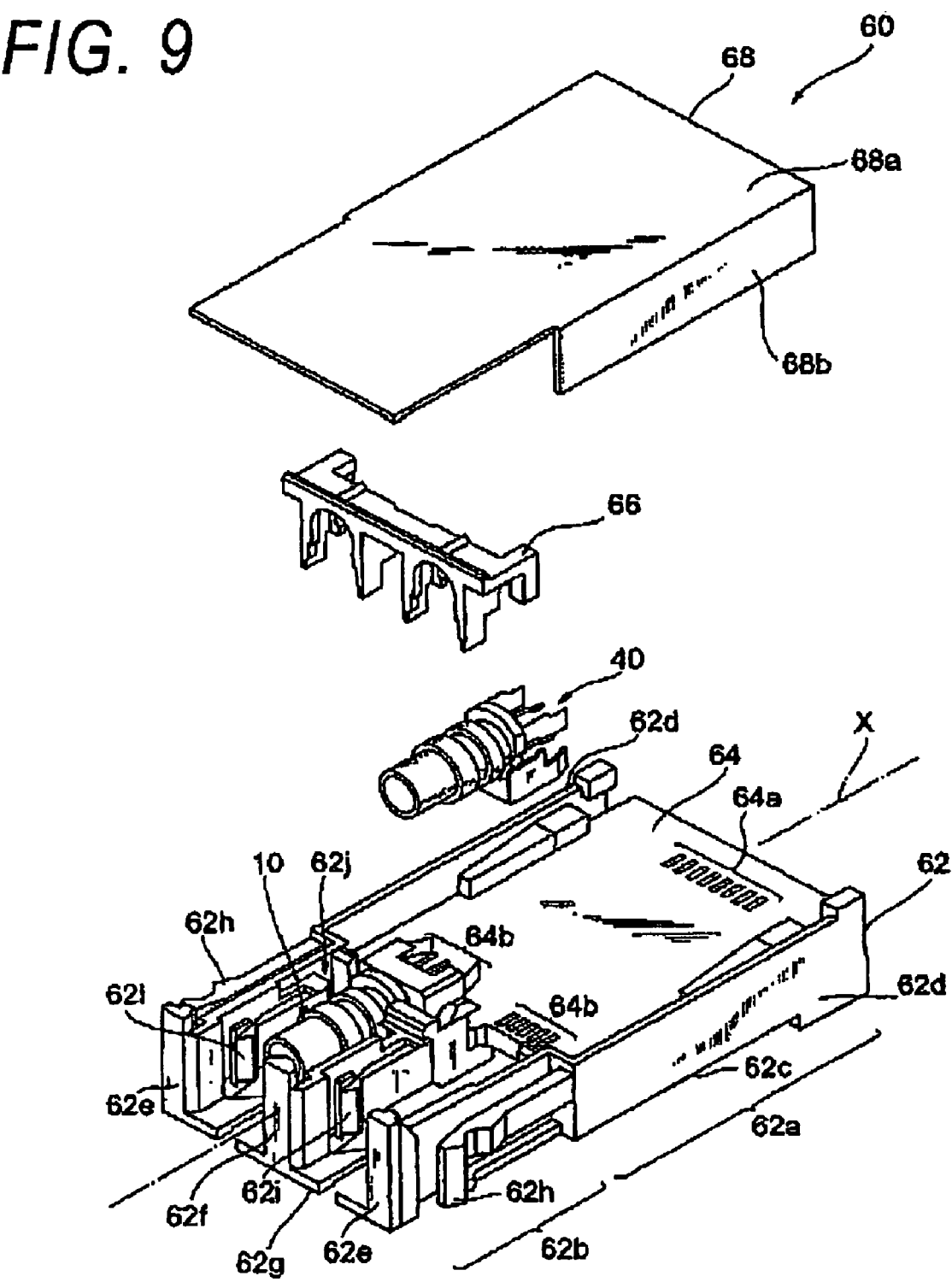
FIG. 9 is an exploded view of still another optical assembly according to the third embodiment of the invention.

Next, as a third embodiment of the invention, an optical data link installing the optical assemblies, 30 and 30, will be described in its configurations and functions. FIG. 9 is an exploded view of the optical data link according to the present invention.

The optical data link 60 illustrated in FIG. 9 comprises optical subassemblies, 10 and 40, a frame 62, a substrate 64, a holder 66, and a cover 68. The frame 62 includes a first portion 62a for securing the substrate 64 and a second portion 62b that primarily forms an optical receptacle. In the fist portion 62a, a bottom 62c and a pair of side walls 62d forms a space into which the substrate 64 is secured. The bottom 62c extends along the axis X, while the side walls 62d extends, from the edge of the bottom 62c to a direction intersecting the axis X. The cover 68 includes a ceiling 68a, which faces the bottom 62c and covers the second portion 62b, and a pair of side covers 68b. The cover 68, cooperating with the frame 62, covers the optical subassemblies, 10 and 40, and the substrate 64.

The substrate 64 provides electrical plug patterns, 64a and 64b, in both end portion thereof. The plug pattern 64a mates with the connector (not illustrated in FIG. 9) assembled on the motherboard. The other plug pattern 64b is connected to the lead pins of the optical subassemblies, 10 and 40.

The second portion 62b of the frame 62 mates with the optical connector (not illustrated in FIG. 9). The second portion 62b comprises a pair of side walls 62e, a center wall 62f and a bottom wall 62g. These walls form the optical receptacle to be mated with the optical connector, and form two spaces into which the optical subassemblies are to be installed.

The outside of the side wall 62e forms a latch 62h to be hooked with the cage provided on the motherboard into which this optical data link 60 is inserted. On the other hand, the inside of the side wall 62e and both sides of the center wall 62f form fins 62i to hook the optical connector inserted into the optical receptacle.

Figure 10:
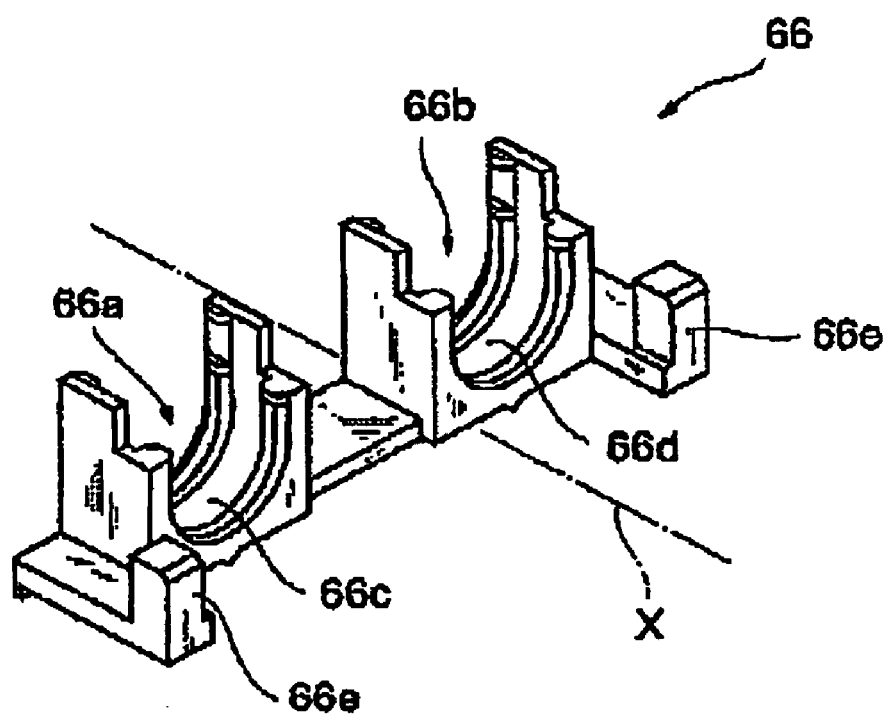
FIG. 10 is a perspective view of the holder.

Further, the inside of the side wall 62e provides a groove 62j extending toward the bottom 62g to position the holder 66. FIG. 10 illustrates a detail of the holder 66. The holder 66, cooperating with the frame 62, positions the optical subassemblies, 10 and 40, to the optical receptacle formed in the second portion 62b of the frame 62.

As shown in FIG. 10. The holder 66 provides two concavities, 66a and 66b, to receive the outer surface of the optical subassemblies, 10 and 40. The concave 66a includes a step 66c depressed to peripheral portions. Similarly, the concave 66b includes a depressed region 66d. The width of respective regions, 66c and 66d, along the axis X corresponds to the width of the second flanges, 24f, 28f, and 30f, of the sleeves. By setting the second flanges, 24f, 28f, and 30f, into this depressed regions, 66c and 66d, the optical subassemblies, 10 and 40, can be positioned to the holder 66, and the holder 66 is positioned to the frame by both sides 66e thereof being set into grooves 62j provided in the frame 62. Thus, the optical assemblies, 10 and 40, can be positioned to the optical receptacle formed in the second portion 62b.

Various modifications of this invention may be considered to those skilled in the art. Nevertheless all deviations from the specific teachings of this specification that basically rely upon the principles and their equivalents through which the art has been advanced are properly considered within the scope of the invention as described and claimed.

What is claimed is:

1. An optical assembly, comprising:
   a semiconductor optoelectronic device;
   a package including a stem and a cap, said stem installing said semiconductor optoelectronic device thereon, and said cap forming, cooperating with said stem, a cavity for covering said semiconductor optoelectronic device; and
   a sleeve having a cylindrical shape with an axis and including a first portion and a second portion, said second portion being attached to said package, and said first portion receiving a ferrule to optically couple an optical fiber secured within said ferrule with said semiconductor optoelectronic device,
   wherein said sleeve is formed by molding an amorphous metal with an oxidized surface and has at least one slit extending along the axis of said cylindrical shape.

2. The optical assembly according to claim 1,
   wherein said sleeve is a split sleeve having a plurality of slits extending along an axis of said cylindrical shape.

3. The optical assembly according to claim 1,
   further comprises a stub secured within said second portion of said sleeve, said stub holding a coupling fiber,
   wherein said optical fiber is optically coupled with said semiconductor optoelectronic device through said coupling fiber.

4. The optical assembly according to claim 1,
   wherein said second portion of said sleeve provides a first flange in an end portion of said sleeve, said first flange being welded to said package.

5. The optical assembly according to claim 4,
   wherein said sleeve further provides a second flange in a region from a boundary between said first portion and said second portion to said second portion.

6. The optical assembly according to claim 1,
   wherein said amorphous metal contains copper (Cu), nickel (Ni), aluminum (Al), and zirconium (Zr).

7. The optical assembly according to claim 1,
wherein said stem provides a mount and said semiconductor optoelectronic device is a semiconductor laser diode mounted on side surface of said mount.

8. The optical assembly according to claim 1,
wherein said semiconductor optoelectronic device is a photodiode mounted on said stem.

9. The optical assembly according to claim 1,
wherein said cap includes a lens in a ceiling thereof secured, with a seal glass, to said cap to seal said cavity in airtight.

10. An optical assembly, comprising:
a semiconductor optoelectronic device;
a package including a stem and a cap, said stem installing said semiconductor optoelectronic device thereon, and said cap forming, cooperating with said stem, a cavity for covering said semiconductor optoelectronic device; and a sleeve having a cylindrical shape with an axis and including a first portion and a second portion, said second portion being attached to said package, and said first portion receiving a ferrule to optically couple an optical fiber secured within said ferrule with said semiconductor optoelectronic device, said first portion including a first cylinder and a second cylinder with a diameter greater than a diameter of said first cylinder, wherein said sleeve is formed by molding an amorphous metal with an oxidized surface and has at least one slit extending along the axis of said cylindrical shape.

11. The optical assembly according to claim 10,
wherein said amorphous metal contains copper (Cu), nickel (Ni), aluminum (Al), and zirconium (Zr).

* * * * *